(12) United States Patent
Deshpande (10) Patent No.: US 10,628,329 B2
(45) Date of Patent: Apr. 21, 2020

(54) DATA PROCESSING SYSTEM HAVING A COHERENCY INTERCONNECT

(71) Applicant: FREESCALE SEMICONDUCTOR, INC., Austin, TX (US)

(72) Inventor: Sanjay R. Deshpande, Austin, TX (US)

(73) Assignee: NXP USA, Inc., Austin, TX (US)

(*) Notice: Subject to any disclaimer, the term of this patent is extended or adjusted under 35 U.S.C. 154(b) by 354 days.

(21) Appl. No.: 15/138,975

(22) Filed: Apr. 26, 2016

(65) Prior Publication Data

US 2017/0308404 A1    Oct. 26, 2017

(51) Int. Cl.
*G06F 12/1027* (2016.01)
*G06F 12/1072* (2016.01)
*G06F 9/30* (2018.01)

(52) U.S. Cl.
CPC ...... *G06F 12/1072* (2013.01); *G06F 9/30087* (2013.01); *G06F 2212/1048* (2013.01); *G06F 2212/682* (2013.01)

(58) Field of Classification Search
None
See application file for complete search history.

(56) References Cited

U.S. PATENT DOCUMENTS

| | | | |
|---|---|---|---|
| 5,954,812 A * | 9/1999 | Shiell | G06F 12/0802 711/145 |
| 6,119,204 A | 9/2000 | Chang et al. | |
| 6,260,131 B1 * | 7/2001 | Kikuta | G06F 12/0837 711/145 |
| 6,263,403 B1 | 7/2001 | Traynor | |
| 6,345,352 B1 | 2/2002 | James et al. | |
| 6,681,313 B1 * | 1/2004 | Trong | G06F 12/1027 711/205 |
| 6,728,800 B1 | 4/2004 | Lee et al. | |
| 7,181,561 B2 * | 2/2007 | Barth | G06F 13/4031 710/310 |
| 7,386,682 B2 * | 6/2008 | Guthrie | G06F 12/0831 710/107 |
| 2003/0200365 A1 * | 10/2003 | Dahlen | G06F 5/065 710/36 |
| 2008/0209130 A1 * | 8/2008 | Kegel | G06F 12/1027 711/135 |
| 2014/0164732 A1 * | 6/2014 | Muff | G06F 12/1027 711/207 |
| 2016/0139922 A1 * | 5/2016 | Craske | G06F 9/45533 712/228 |

* cited by examiner

*Primary Examiner* — Lewis A Bullock, Jr.
*Assistant Examiner* — Bruce S Ashley (57) ABSTRACT

A processing system includes a first processor configured to issue a first request in a first format, an adapter configured to receive the first request in the first format and send the first request in a second format, and a memory coherency interconnect configured to receive the first request in the second format and determine whether the first request in the second format is for a translation lookaside buffer (TLB) operation or a non-TLB operation based on information in the first request in the second format. When the first request in the second format is for a TLB operation, the interconnect routes the first request in the second format to a TLB global ordering point (GOP). When the first request in the second format is not for a TLB operation, the interconnect routes the first request in the second format to a non-TLB GOP.

18 Claims, 3 Drawing Sheets

DATA PROCESSING SYSTEM HAVING A COHERENCY INTERCONNECT

BACKGROUND

Field

This disclosure relates generally to data processing systems, and more specifically, to data processing system having a coherency interconnect.

Related Art

In an ARM® processor (ARM is a registered trademark of ARM Limited), distributed virtual memory (DVM) operations can be used to perform operations on a look-aside buffer, such as a translation look-aside buffer (TLB), or other types of look-aside buffers such as a branch target buffer (BTB). In a system using ARM processors, these DVM operations require the implementation of a special agent called "Miscellaneous Node" (MN). The use of a single MN to handle DVM operations in a system with a plurality of processors results in inefficient operation and prevents a system from being scalable. Therefore, a need exists for improved handling of DVM operations.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In a data processing system, a plurality of processor can be interconnected via a coherency network. Operations can be communicated among the processors with the coherency network. As discussed above, a DVM operation can be requested by a processor to perform an operation on a look-aside buffer, such as a TLB. Therefore, these DVM operations may include TLB operations, such as a TLB invalidate entry operation and a TLB sync operation. A TLB invalidate entry operation operates to invalidate entries in a TLB and a TLB sync operation ensures that every processor or module has completed its TLB operations at a particular time before proceeding.

In one embodiment, each DVM operation (which has a first format) is translated, by an adapter, into a second format useable by the coherency network. In one embodiment, each DVM operation that is a TLB-related operation, when provided in the second format to a coherency network, is provided as two separate transactions, each with a portion of the payload for the DVM operation. For example, the first transaction may include the address information and the second transaction may be other information required for the DVM operation. Since each DVM operation translates into two TLB transactions in the coherency network, these two transactions need to be performed in that order. Therefore, TLB global ordering points (GOPs) ensure that the two transactions for the TLB operation are performed in the appropriate order. For non-TLB operations provided to the coherency network, non-TLB global ordering points (GOPs) are used to order the operations. The use of dedicated TLB GOPs allows for the pair of transactions for each TLB operation to stay together without intervening operations. The use of non-TLB GOPs allows for the non-TLB operations to bypass TLB operations, as needed.

Figure 1:
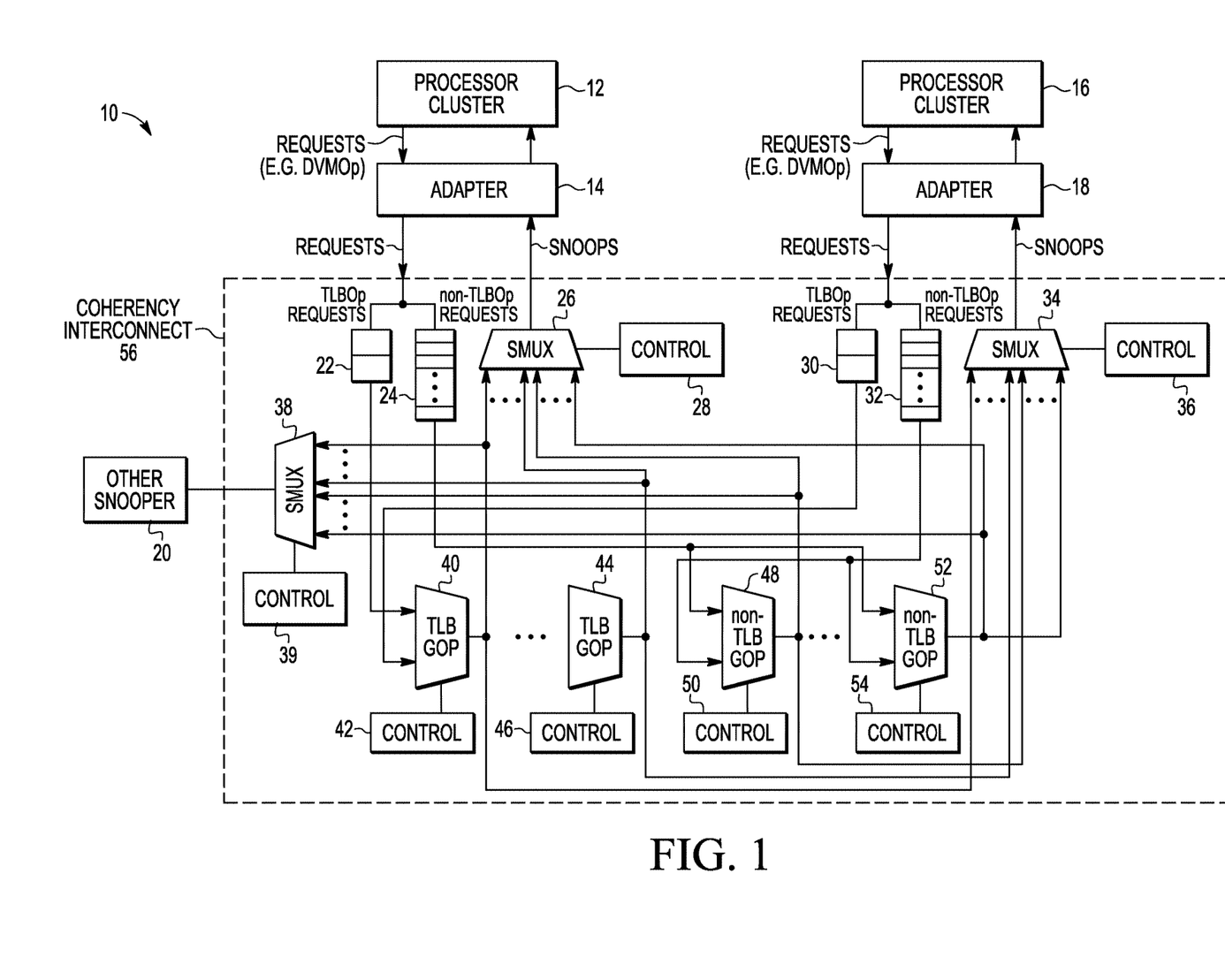
FIG. 1 illustrates, in block diagram form, a data processing system in accordance with one embodiment of the present invention.

FIG. 1 illustrates, in block diagram form, a data processing system 10 in accordance with one embodiment of the present invention. System 10 includes one or more processor clusters, such as processor cluster 12 and processor cluster 16. Each processor cluster may include one or more processing element, such as a processor or core. System 10 includes an adapter corresponding to each processor cluster, such as adapter 14 and adapter 18. System 10 includes a coherency interconnect 56 (also referred to as a coherency network) and an other snooper 20. Other snooper 20 can be any type of processing elements which snoops transactions through coherency interconnect 56, including target devices which snoop transaction through coherency interconnect 56. Note that system 10 may include any number of other snoopers. Adapter 14 is coupled between processor cluster 12 and coherency interconnect 56, adapter 18 is coupled between processor cluster 16 and coherency interconnect 56, and other snooper 20 is coupled to coherency interconnect 56. Processor cluster 12 provides requests, such as DVM operation (DVMOp) requests, to adapter 14 and receives responses from adapter 14. Processor cluster 16 provides requests, such as DVMOp requests, to adapter 18 and receives response from adapter 18. System 10 may also include any number of shared or dedicated memories, as needed, coupled to coherency interconnect 56.

Coherency interconnect 56 routes requests and snoop responses among elements of system 10. For example, processor clusters 12 and 16 may send request to other elements in system 10 and snoop responses may be routed back or broadcast to processor clusters 12 and 16 and to other snooper 20. Coherency interconnect 56 includes first-in-first-out (FIFO) circuitry 22, 24, 30, and 32. In the illustrated embodiment, each of FIFOs 22 and 30 are two element FIFOs capable of storing two requests (or transactions). FIFOs 24 and 32 may include any number of entries. Coherency interconnect 56 also includes snoop multiplexers (SMUXes) 26, 34, and 38, and control circuitries 28, 36, and 39 coupled to the control inputs of SMUXes 26, 34, and 38, respectively. Coherency interconnect 56 includes any number of TLB GOPs, such as TLB GOPs 40 and 44, and any number of non-TLB GOPs, such as non-TLB GOPs 48 and 52. In the illustrated embodiment, each TLB GOP and non-TLB GOP is implemented as a multiplexer (MUX), and coherency interconnect 56 includes control circuitries, such as control circuitries 42, 46, 50, and 54 coupled to the control inputs of GOPs 40, 44, 48, and 52, respectively.

Each adapter outputs requests to coherency interconnect 56, which can be TLB operation (TLBOp) requests or non-TLB requests, and each adapter and other snooper 20 receives snoop responses. TLBOp requests, as described above, have two transactions (TLBOp1 and TLBOp2). Each TLBOp request from adapter 14 is sent to FIFO 22 and each non-TLB request from adapter 14 is sent to FIFO 24. Each TLBOp request from adapter 18 is sent to FIFO 30 and each non-TLB request from adapter 18 is sent to FIFO 32. The outputs of FIFOs 22 and 30 are coupled to data inputs of TLB GOP 40. The outputs of FIFOs 24 and 32 are coupled to data inputs of non-TLB GOP 48. The output of each TLB GOP, such as TLB GOP 40 and TLB GOP 44, is coupled to a data input of each of SMUX 38, 26, and 34. The output of each non-TLB GOP, such as non-TLB GOP 48 and non-TLB GOP 52, is coupled to a data input of each of SMUX 38, 26, and 34. The output of SMUX 38 is coupled to the snoop request input of other snooper 20, the output of SMUX 28 is coupled to the snoop request input of adapter 14, and the output of SMUX 34 is coupled to the snoop request input of adapter 18. Control circuitries 28 and 36 allow for each output of the corresponding SMUX to be selected from its inputs and provided back to the adapter and from there back to the processor core cluster.

In operation, TLBOp requests, which can include TLBOp1 and TLBOp2 transactions, are sent to two-element FIFO's 22 and 30. This ensures that the two transactions of a TLBOp are snooped and performed in order and in a consecutive manner. In one embodiment, the TLBOp request is a TLB invalidate operation, which invalidates the entries identified by the address provided in the two transactions, or a TLB sync operation which ensures that all TLB operations are done by a particular point in time before proceeding further. Each TLBOp is routed as a snoop via the coherency network to each of the other processor clusters and to any other snoopers. In response, coherency responses are broadcast back to the other snooper and processor clusters so that each processor and snooper can ensure coherency.

Figure 2:
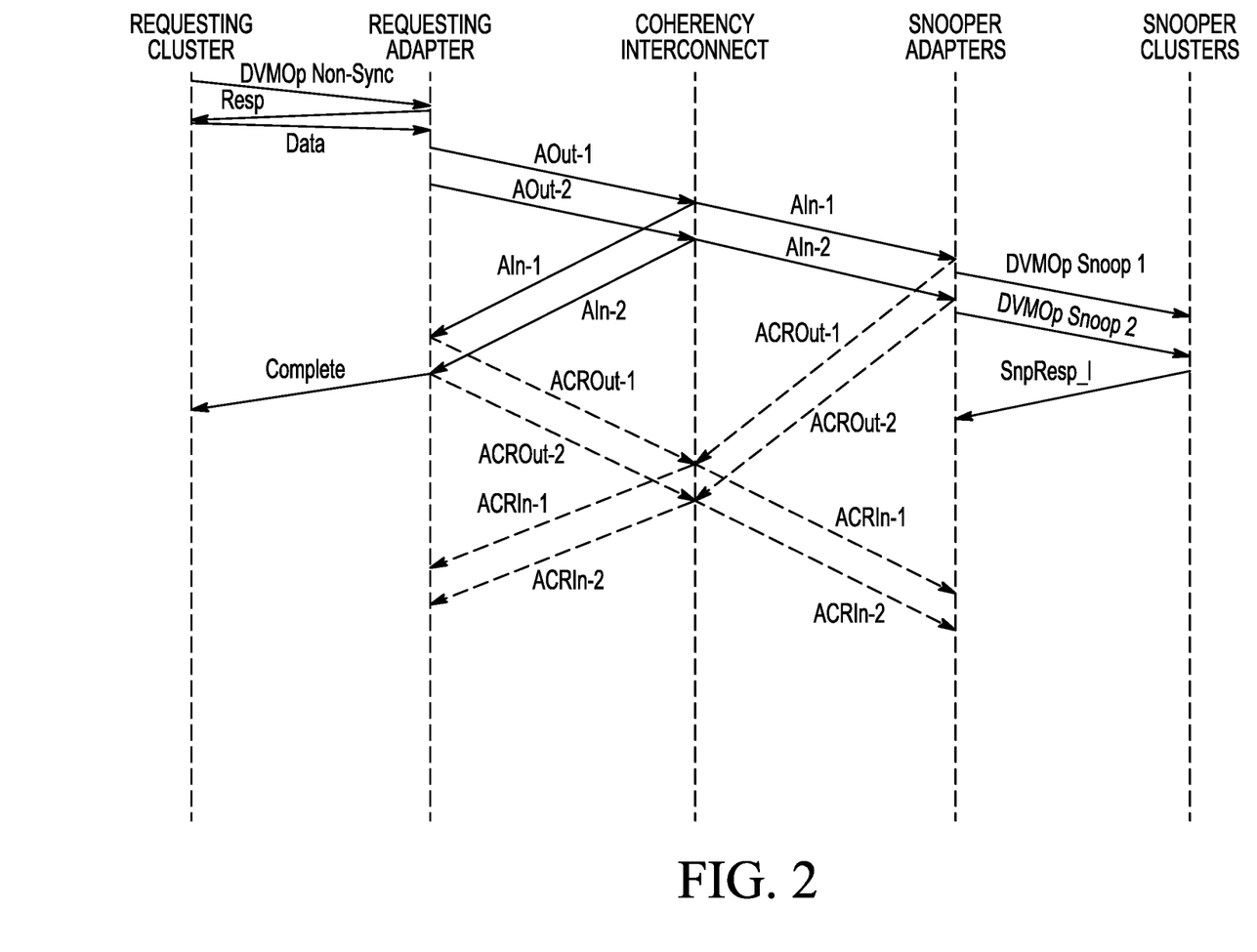
FIGS. 2 and 3 illustrate, in diagrammatic form, operations within the data processing system of FIG. 1.

FIG. 2 illustrates a flow of operations for a DVMOp non-sync operation, such as for a TLB invalidate operation. The requesting cluster (e.g. processor cluster 12 or 16) requests a DVMOp which is a non-sync operation, such as a TLB invalidate. This DVMOp request (as well as Data corresponding to the DVMOp request) is provided in the first format to the requesting adapter corresponding to the requesting cluster (e.g. adapter 14 or 18), as indicated by the arrows going from the requesting cluster line to the requesting adapter line. Note that a response, DBIDResp, may be provided back to the requesting cluster before Data corresponding to the DVMOp request is provided to the requesting adapter. The requesting adapter translates the DVMOp into the second format useable by the coherency interconnect, in which the DVMOp is separated into two transactions: AOut-1 and AOut-2. These correspond to TLBOp1 and TLBOp2 described above. These are each provided to coherency interconnect 56 (as indicated by the arrows from the requesting adapter line to the coherency interconnect line) and are stored in the corresponding TLB FIFO to the requesting cluster (e.g. FIFO 22 or 30). In the case of a TLB invalidate operation (or another DVMOp that is also a non-sync operation), a snoop can be returned to the requesting adapter after the second transaction has been provided to the coherency interconnect. Therefore, AIn-1 corresponds to the snoop provided back to the requesting adapter for AOut-1, and AIn-2 corresponds to the snoop provided back to the requesting adapter for AOut-2, as indicated by the arrows going back from the coherency interconnect line to the requesting adapter line. Upon receiving the second snoop, AIn-2, the TLB invalidate operation requested by the requesting cluster is considered complete, from the perspective of the requesting cluster, and thus a complete indicator is then returned back to the requesting cluster, as indicated by the arrow from the requesting adapter line to the requesting cluster line. That is, although the invalidate operation may not yet have been performed by the snoopers, it is complete from the perspective of the requesting cluster.

Still referring to FIG. 2, after the two transactions are provided to the coherency interconnect (e.g. to FIFO 22 or 30), the transactions are provided to the snooper adapters of system 10. These correspond to the adapters of processing clusters which are snooping the operation and to other snooper 20. Note that snooper 20 which may also use an adapter, similar to adapters 14 and 18, to translate the operations. Note that due to the two element FIFOs and the FIFO TLBs, the two transactions are guaranteed to stay together. In the example that the two transactions are from adapter 14 and are stored in FIFO 22, the control of the FIFO TLB, such as control 42, selects its input as FIFO 22 for two cycles such that both transactions go to each SMUX without any intervening transactions. Also, each SMUX, when selecting a TLB transaction, selects the same TLB GOP for two cycles. Therefore, after each snooper adapter receives AIn-1 and AIn-2 (as indicated by the arrows from the coherency interconnect line to the snooper adapter line), each snooper cluster translates these transactions into DVMOp snoops to provide back to the snooper cluster. For example, AIn-1 gets translated to DVMOp Snoop 1 and AIn-2 gets translated to DVMOp Snoop 2, as indicated by the arrows from the snooper adapter line to the snooper cluster line. This is done by each snooper adapter and snooper cluster. In response, the snooper cluster provides a snoop response, SnpResp_1 back to the snooper adapter.

The dotted arrows in FIG. 2 represent the coherency responses provided at each stage of the data flow so that all elements in system 10 receive the same information for coherency purposes. Therefore, as illustrated by the dotted arrows from the requesting adapter line and snooper adapter line to the coherency interconnect line, coherency responses can be output as ACROut-1 and ACROut-2 in response to AIn-1 and AIn-2, respectively, from the requesting adapter to the coherency interconnect and as ACROut-1 and ACROut-2 in response to AIn-1 and AIn-2, respectively, from the snooper adapter to the coherency interconnect. These coherency responses can then be combined from all requesting and snooper adapters to form a combined coherency response that is returned from the coherency interconnect to the requesting adapter and snooper adapters as ACRIn-1 and ACRIn-2 (as illustrated by the dotted lines from the coherency interconnect line back to the requesting adapter line and snooper adapters line).

Figure 3:
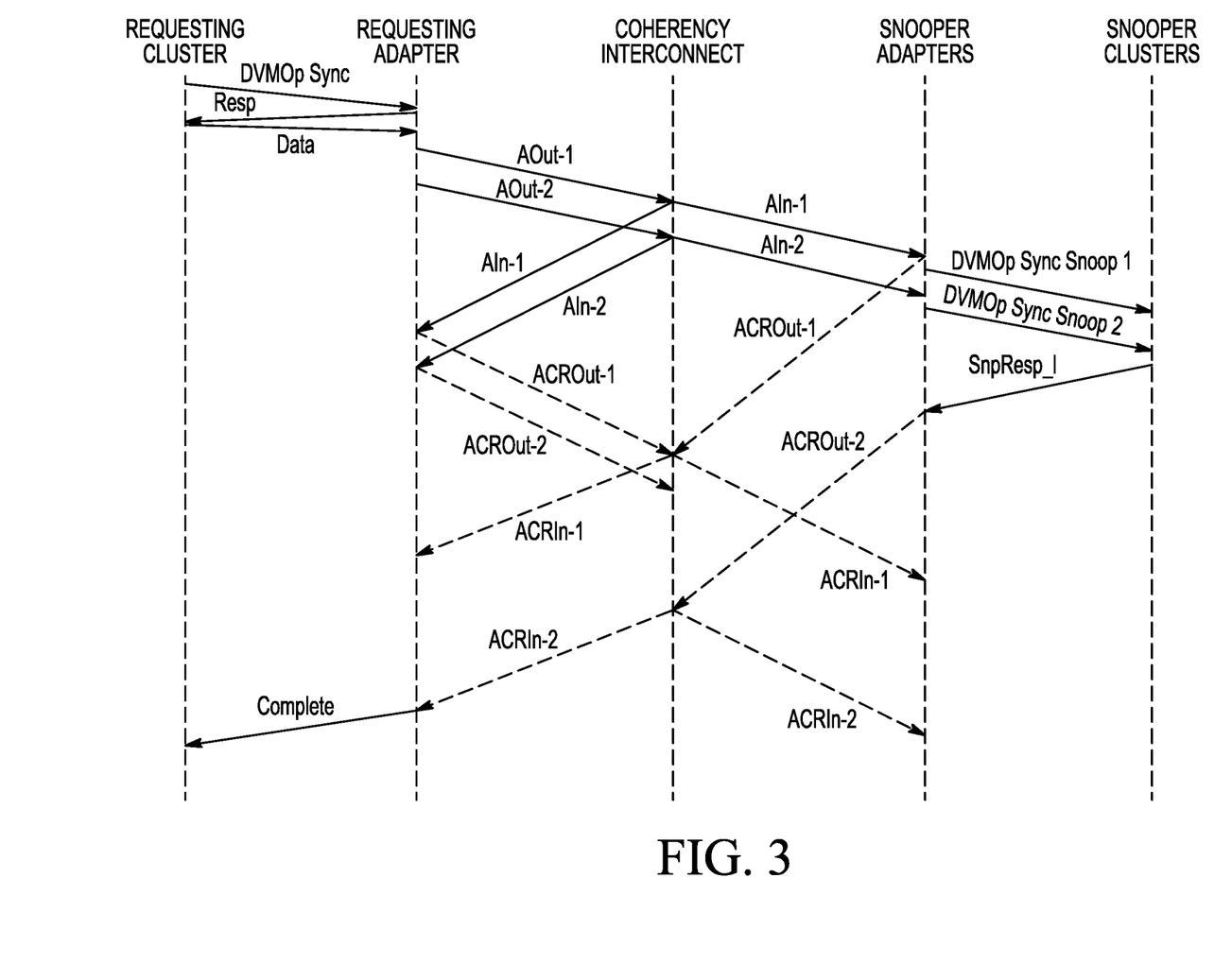

FIG. 3 illustrates a flow of operations for a DVMOp sync operation, such as for a TLB sync operation. The requesting cluster (e.g. processor cluster 12 or 16) requests a DVMOp which is a sync operation, such as a TLB sync. This DVMOp request (as well as Data corresponding to the DVMOp request) is provided in the first format to the requesting adapter corresponding to the requesting cluster (e.g. adapter 14 or 18), as indicated by the arrows going from the requesting cluster line to the requesting adapter line. Note that a response, DBIDResp, may be provided back to the requesting cluster before Data corresponding to the DVMOp Sync request is provided to the requesting adapter. The requesting adapter translates the DVMOp Sync into the second format useable by the coherency interconnect, in which the DVMOp Sync is separated into two transactions: AOut-1 and AOut-2. These correspond to TLBOp1 and TLBOp2 described above. These are each provided to coherency interconnect 56 (as indicated by the arrows from the requesting adapter line to the coherency interconnect line) and are stored in the corresponding TLB FIFO to the requesting cluster (e.g. FIFO 22 or 30). In the case of a TLB sync operation (or another DVMOp that is also a sync operation), a response is not returned to the requesting adapter until after both the first and second transactions has been provided to the snooper clusters and a response from the snooper clusters received and transmitted back to the requesting adapter. Therefore, as compared to a DVMOp non-sync operation, such as a TLB invalidate operation, the completion notification of the operation occurs later in time.

Referring back to FIG. 3, AIn-1 corresponds to the response provided for AOut-1 back to the requesting adapter and to the snooper adapter, and AIn-2 corresponds to the response provided for AOut-2 back to the requesting adapter and to the snooper adapter, as indicated by the arrows going back from the coherency interconnect line to the requesting adapter line and from the coherency interconnect line to the snooper adapters line. The transactions are stored in the coherency network in the FIFO corresponding to the requesting cluster (e.g. FIFO 22 or 30) which guarantees that the transactions stay together. As discussed above in reference to FIG. 2, in the example that the two transactions are from adapter 14 and are stored in FIFO 22, the control of the FIFO TLB, such as control 42, selects its input as FIFO 22 for two cycles such that both transactions go to each SMUX without any intervening transactions. Also, each SMUX, when selecting a TLB transaction, selects the same TLB GOP for two cycles.

After each snooper adapter receives AIn-1 and AIn-2 as successive transactions, each snooper cluster translates these transactions into DVMOp snoops to provide back to the snooper cluster. For example, AIn-1 gets translated to DVMOp Snoop 1 and AIn-2 gets translated to DVMOp Snoop 2, as indicated by the arrows from the snooper adapter line to the snooper cluster line. This is done by each snooper adapter and snooper cluster. In response, each snooper cluster provides a snoop response, SnpResp_1 back to the snooper adapter.

The dotted arrows in FIG. 3 represent the coherency responses provided at each stage. Therefore, as illustrated by the dotted arrows from the requesting adapter line and snooper adapter line to the coherency interconnect line, coherency responses are output as ACROut-1 in response to AIn-1 from the requesting adapter and the snooper adapters to the coherency interconnect, as illustrated by the first dotted lines from the requesting adapter and snooper adapters line to the coherency interconnect line. A coherency response is output as ACROut-2 in response to AIn-2 from the requesting adapter to the coherency interconnect, as illustrated by the second dotted line from the requesting adapter line to the coherency interconnect line. However, a coherency response is not provided from a snooper adapter until the snoop response is received by the snooper adapter. Therefore, as illustrated in FIG. 3, after the second transaction, DVMOp Sync Snoop 2 (corresponding to the second TLB sync transaction of AOut-2), the snoop response SnpResp_1 is provided from the snooper cluster to the snooper adapter. It is in response to this snoop response that a coherency response, ACROut-2 is provided back to the coherency interconnect, as illustrated by the second dotted line from the snooper adapter line to the coherency interconnect line.

These coherency responses are then be combined from all requesting and snooper adapters to form a combined coherency response that is returned from the coherency interconnect to the requesting adapter and snooper adapters. The combined coherency response in response to ACROut-1 is provided as ACRIn-1 from the coherency interconnect to the requesting adapter and snooper adapters (as illustrated by the first dotted lines from the coherency interconnect line back to the requesting adapter line and snooper adapters line). The combined coherency response in response to ACROut-2 is provided as ACRIn-2 in response to the ACROut-2 collected in response to the SnpResp_1 from the snooper adapters and from the ACRIn-2 in response to the ACROut-2 from the requesting adapter. In response to ACRIn-2 from the coherency interconnect to the requesting adapter, a complete indicator can be returned from the requesting adapter to the requesting cluster. That is, the DMOp Sync is not complete until the second transaction has been completed by each of the snooper clusters (and returned as SnpResp_1 to the coherency interconnect from each snooper cluster) and the appropriate responses from the snooper adapters (in response to SnpResp_1) have been accumulated to provide ACRIn-2 back to the requesting adapter.

Referring back to FIG. 1, note that non-TLB requests are provided to non-TLB FIFOs, such as FIFOs 24 and 32. These are routed to non-TLB GOPs. In this manner, non-TLB requests can continue to be completed, bypassing requests in the TLB request FIFOs as needed, so as not to stall system 10. By using dedicated TLB FIFOs and TLB GOPs, the TLB pair of transactions for each TLB operation are guaranteed to stay together without intervening operations. This is further accomplished by ensuring that the control input of the TLB GOPs and the control inputs of the SMUXes select both transactions in the TLB pair of transactions in turn, without allowing intervening transactions. However, the use of non-TLB FIFOs and non-TLB GOPs allows for the non-TLB operations to continue, as needed, without being affected by problems with the TLB operations.

Therefore, by now it can be appreciated how an improved method for handling DVMOps is achieved using TLB FIFOs and TLB GOPs within a data processing system. Furthermore, any number of TLB FIFOs and TLB GOPs can be used within a coherency interconnect which allows for scalability of a data processing system. That is, additional processor clusters or elements can be added to system 10 with additional TLB FIFOs and TLB GOPs (or additional TLB GOP inputs) added, as needed, to accommodate the additional clusters.

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of system 10 are circuitry located on a single integrated circuit or within a same device. Alternatively, system 10 may include any number of separate integrated circuits or separate devices interconnected with each other.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the adapters may or may not be present in system 10. If not present, then each processor cluster can output the TLB transactions of a TLB operation directly to the coherency interconnect. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

In one embodiment, a processing system includes a first processor configured to issue a first request in a first format; an adapter configured to receive the first request in the first format and send the first request in a second format; a memory coherency interconnect configured to receive the first request in the second format and determine whether the first request in the second format is for a translation lookaside buffer operation or a non-TLB operation based on information in the first request in the second format, and when the first request in the second format is for a TLB operation, the interconnect routes the first request in the second format to a TLB global ordering point (GOP), and when the first request in the second format is not for a TLB operation, the interconnect routes the first request in the second format to a non-TLB GOP. In one aspect, the processing system further includes a snoop multiplexer configured to receive an output from the TLB and non-TLB GOPs and provide the first request in the second format to the adapter. In a further aspect, the adapter is configured to provide the first request in the first format to the first processor. In another aspect, when the first request in the second format is for a TLB operation, the second format includes first and second transactions of the TLB operation. In a further aspect, the processing system further includes the first and second transactions of the first request in the second format each include a portion of payload data associated with the first request. In another further aspect, the processing system further includes a buffer in the memory coherency manager coupled to store a second request in the second format until the first and second transactions of the first request in the second format are processed. In another aspect, the request in the first format is a distributed virtual memory (DVM) operation. In another aspect, the TLB operation is one of a TLB invalidate entry operation and a TLB sync operation. In another further aspect, the payload data includes an address in a memory. In another aspect, the payload data includes an indicator whether the first request in the second format is for a translation lookaside buffer (TLB) operation or a non-TLB operation. In another aspect, the processing system further includes a second processor coupled to the memory coherency interconnect via a second adapter, wherein the second processor is implemented on a different semiconductor substrate than the first processor; the second adapter is configured to receive a second request in the first format from the second processor and send the second request in the second format to the memory coherency interconnect. In another further aspect, the processing system further includes when the TLB operation is the TLB invalidate entry operation, the adapter sends an operation send complete indicator to the first processor in the first format as soon as the adapter receives a response to the first request in the second format from the memory coherency manager even if the TLB invalidate entry operation is still being broadcast to other processors in the processing system; and when the TLB operation is the TLBsync operation, the adapter waits to send a sync operation complete indicator to the first processor in the first format until a response to all transactions of the TLBsync operation in the second format have been collected from the other processors in the processing system and transmitted to the adapter.

In another embodiment, a method includes issuing a first request in a first format from a processor in a processing system to an adapter; converting the first request in the first format to a first request in a second format; when the first request in the second format includes an indicator that the first request in the second format is a translation lookaside buffer (TLB) operation, routing the first request in the second format to a TLB global ordering point (GOP) in a memory coherency interconnect; and when the first request in the second format includes an indicator that the first request in the second format is not a translation lookaside buffer (TLB) operation, routing the first request in the second format to a non-TLB GOP in the memory coherency interconnect. In one aspect, when the first request in the second format includes the indicator that the first request in the second format is a translation lookaside buffer (TLB) operation, the converting the first request in the first format to the first request in the second format comprises generating a first transaction and a second transaction based on the first request, wherein the first transaction includes a first portion of payload data for the first request and the second transaction includes a second portion of the payload data for the first request, wherein the first and second payload data collectively include a memory address for the first request. In another aspect, the method further includes processing the first transaction and the second transaction in order before processing first and second transactions associated with a second request. In another aspect, the method further includes routing output from the TLB GOP to a first snoop multiplexer and a second snoop multiplexer, sending a snoop of the first request from the first snoop multiplexer to the adapter; sending a snoop of the first request from the second snoop multiplexer to a second adapter. In a further aspect, the method further includes converting the snoop of the first request from the second format to the first format to form a converted snoop response in the adapter; converting the snoop of the first request from the second format to the first format to form a second converted snoop response in the second adapter; sending the converted snoop to the processor; sending the second converted snoop to the second processor.

In yet another embodiment, a processing system includes a processor configured to issue a first request in a first format; an adapter configured to convert the first request in the first format to a first request in a second format; a memory coherency interconnect configured to route two transactions based on the first request in the second format to a TLB global ordering point (GOP) when the first request in the second format includes an indicator that the first request in the second format is a translation lookaside buffer (TLB) operation, and route the first request in the second format to a non-TLB GOP in the memory coherency interconnect when the first request in the second format includes an indicator that the first request in the second format is not a translation lookaside buffer (TLB) operation. In one aspect, a first of the two transactions includes a first portion of payload data for the first request and a second of the two transactions includes a second portion of the payload data for the first request, wherein the first and second payload data collectively include a memory address for the first request. In another aspect, the processing system further includes when the TLB operation is a TLB invalidate entry operation, the adapter sends an operation send complete indicator to the processor as soon as the adapter receives a snoop to the first request in the second format from the memory coherency manager even if the TLB invalidate entry operation is still being broadcast to other processors in the processing system; and when the TLB operation is a TLBsync operation, the adapter waits to send a sync operation complete indicator to the first processor until a response to both of the two transactions of the TLBsync operation has been received from the other processors in the processing system.

What is claimed is:

1. A processing system comprising:
   a plurality of processors, including a first processor configured to issue a first request in a first format;
   an adapter configured to receive the first request in the first format and send the first request in a second format;
   a memory coherency interconnect configured to receive the first request in the second format and determine whether the first request in the second format is a translation lookaside buffer (TLB) operation or a non-TLB operation based on information in the first request in the second format, wherein the TLB operation is one of a TLB invalidate entry operation which invalidates a TLB entry identified by the TLB invalidate entry operation or a TLB sync operation which ensures that each processor of the plurality of processors has completed their TLB operations by a particular point in time, and
   when the first request in the second format is for the TLB invalidate entry operation or the TLB sync operation, the second format includes first and second transactions of the TLB operation and the interconnect routes the first request in the second format to a TLB global ordering point (GOP) which is dedicated to TLB operations and ensures that the first and second transactions of the TLB operation stay ordered correctly without intervening transactions,
   when the TLB operation is the TLB invalidate entry operation, the adapter sends an operation send complete indicator to the first processor in the first format as soon as the adapter receives a response to the first request in the second format from the memory coherency manager even if the TLB invalidate entry operation is still being broadcast to other processors in the processing system;
   when the TLB operation is the TLBsync operation, the adapter waits to send a sync operation complete indicator to the first processor in the first format until a response to all transactions of the TLBsync operation in the second format have been collected from the other processors in the processing system and transmitted to the adapter, and
   when the first request in the second format is the non-TLB operation, the interconnect routes the first request in the second format to a non-TLB GOP,
   wherein the TLB GOP comprises a first multiplexer which is dedicated to routing only TLB operations such that each TLB operation, including the TLB invalidate entry operation or the TLB sync operation, is received at a data input of the first multiplexer and a selected TLB operation is provided at an output of the first multiplexer and when the first multiplexer routes the selected TLB operation, a control input of the first multiplexer selects the selected TLB operation for two cycles,
   and the non-TLB GOP comprises a second multiplexer which is dedicated to routing non-TLB operations.

2. The processing system of claim 1 further comprising: a snoop multiplexer is configured to receive an output from the TLB and non-TLB GOPs and provide the first request in the second format to the adapter.

3. The processing system of claim 2 wherein: the adapter is configured to provide the first request in the first format to the first processor.

4. The processing system of claim 1 further comprising: the first and second transactions of the first request in the second format each include a portion of payload data associated with the first request.

5. The processing system of claim 4 wherein: the payload data includes an address in a memory.

6. The processing system of claim 1 further comprising: a buffer in the memory coherency manager coupled to store a second request in the second format until the first and second transactions of the first request in the second format are processed.

7. The processing system of claim 1 wherein: the request in the first format is a distributed virtual memory (DVM) operation.

8. The processing system of claim 1 wherein:
the payload data includes an indicator whether the first request in the second format is for a translation lookaside buffer (TLB) operation or a non-TLB operation.

9. The processing system of claim 1 further comprising:
a second processor coupled to the memory coherency interconnect via a second adapter, wherein the second processor is implemented on a different semiconductor substrate than the first processor;
the second adapter is configured to receive a second request in the first format from the second processor and send the second request in the second format to the memory coherency interconnect.

10. The processing system of claim 1, the memory coherency interconnect further comprising:
a TLB buffer dedicated to TLB operations; and
a non-TLB buffer dedicated to non-TLB operations, wherein when the first request in the second format is for a TLB operation, the interconnect routes the first request in the second format to the TLB GOP via the TLB buffer, and wherein when the first request in the second format is not for a TLB operation, the interconnect routes the first request in the second format to the non-TLB GOP via the non-TLB buffer.

11. The processing system of claim 1, wherein when the first multiplexer routes a TLB operation, a control of the first multiplexer selects an input corresponding to the TLB operation for two cycles.

12. A method comprising:
issuing a first request in a first format from a processor in a processing system to an adapter;
converting the first request in the first format to a first request in a second format;
when the first request in the second format includes an indicator that the first request in the second format is a translation lookaside buffer (TLB) operation, including one of a TLB invalidate entry operation which invalidates a TLB entry identified by the TLB invalidate entry operation or a TLB sync operation which ensures that each processor of the processing system has completed their TLB operations by a particular point in time, the second format includes first and second transactions of the TLB operation and routing the first request in the second format to a TLB global ordering point (GOP) in a memory coherency interconnect, wherein the TLB GOP is dedicated to TLB operations and ensures that the first and second transactions of the TLB operation are ordered correctly without intervening transactions; and
when the TLB operation is the TLB invalidate entry operation, the adapter sends an operation send complete indicator to the first processor in the first format as soon as the adapter receives a response to the first request in the second format from the memory coherency manager even if the TLB invalidate entry operation is still being broadcast to other processors in the processing system;
when the TLB operation is the TLBsync operation, the adapter waits to send a sync operation complete indicator to the first processor in the first format until a response to all transactions of the TLBsync operation in the second format have been collected from the other processors in the processing system and transmitted to the adapter, and
when the first request in the second format includes an indicator that the first request in the second format is not a translation lookaside buffer (TLB) operation, routing the first request in the second format to a non-TLB GOP in the memory coherency interconnect, wherein the TLB GOP comprises a first multiplexer which is dedicated to routing only TLB operations such that each TLB operation, including the TLB invalidate entry operation or the TLB sync operation, is received at a data input of the first multiplexer and a selected TLB operation is provided at an output of the first multiplexer and when the first multiplexer routes the selected TLB operation, a control input of the first multiplexer selects the selected TLB operation for two cycles,
and the non-TLB GOP comprises a second multiplexer which is dedicated to routing only non-TLB operations.

13. The method of claim 12 wherein when the first request in the second format includes the indicator that the first request in the second format is a translation lookaside buffer (TLB) operation, the converting the first request in the first format to the first request in the second format comprises generating the first transaction and the second transaction based on the first request, wherein the first transaction includes a first portion of payload data for the first request and the second transaction includes a second portion of the payload data for the first request, wherein the first and second payload data collectively include a memory address for the first request.

14. The method of claim 12 further comprising:
processing the first transaction and the second transaction in order before processing first and second transactions associated with a second request.

15. The method of claim 14 further comprising
routing output from the TLB GOP to a first snoop multiplexer and a second snoop multiplexer, sending a snoop of the first request from the first snoop multiplexer to the adapter;
sending a snoop of the first request from the second snoop multiplexer to a second adapter.

16. The method of claim 15 further comprising:
converting the snoop of the first request from the second format to the first format to form a converted snoop response in the adapter;
converting the snoop of the first request from the second format to the first format to form a second converted snoop response in the second adapter; sending the converted snoop to the processor; sending the second converted snoop to the second processor.

17. A processing system comprising:
a processor configured to issue a first request in a first format;
an adapter configured to convert the first request in the first format to a first request in a second format;
a memory coherency interconnect configured to
route two transactions based on the first request in the second format to a TLB global ordering point (GOP) when the first request in the second format includes an indicator that the first request in the second format is a translation lookaside buffer (TLB) operation, wherein the TLB operation is one of a TLB invalidate entry operation which invalidates a TLB entry identified by the TLB invalidate entry operation or a TLB sync operation which ensures that each processor of the plurality of processors has completed their TLB operations by a particular point in time, and wherein the TLB GOP is dedicated to TLB operations and ensures that the first and second transactions of the TLB operation are ordered correctly without intervening transactions, and when the TLB operation is a TLB invalidate entry operation, the adapter sends an operation send complete indicator to the processor as soon as the adapter receives a snoop to the first request in the second format from the memory coherency manager even if the TLB invalidate entry operation is still being broadcast to other processors in the processing system;

when the TLB operation is a TLBsync operation, the adapter waits to send a sync operation complete indicator to the first processor until a response to both of the two transactions of the TLBsync operation has been received from the other processors in the processing system, route the first request in the second format to a non-TLB GOP in the memory coherency interconnect when the first request in the second format includes an indicator that the first request in the second format is not a translation lookaside buffer (TLB) operation, wherein the TLB GOP comprises a first multiplexer which is dedicated to routing only TLB operations such that each TLB operation, including the TLB invalidate entry operation or the TLB sync operation, is received at a data input of the first multiplexer and a selected TLB operation is provided at an output of the first multiplexer and when the first multiplexer routes the selected TLB operation, a control input of the first multiplexer selects the selected TLB operation for two cycles, and the non-TLB GOP comprises a second multiplexer which is dedicated to routing only non-TLB operations.

18. The method of claim 17, wherein a first of the two transactions includes a first portion of payload data for the first request and a second of the two transactions includes a second portion of the payload data for the first request, wherein the first and second payload data collectively include a memory address for the first request.

* * * * *